US012637960B2

(12) United States Patent　　　(10) Patent No.:　　US 12,637,960 B2
Chow et al.　　　　　　　　　　　(45) Date of Patent:　　May 26, 2026

(54) AIRCRAFT BALL BEARING SQUIRREL CAGE WITH BEAMS WITH ENLARGED ENDS

(71) Applicant: Pratt & Whitney Canada Corp., Longueuil (CA)

(72) Inventors: Bernard Chow, Mississauga (CA); Lucas Da Silva Maciel, Etobicoke (CA)

(73) Assignee: Pratt & Whitney Canada Corp., Longueuil (CA)

( * ) Notice: Subject to any disclaimer, the term of this patent is extended or adjusted under 35 U.S.C. 154(b) by 38 days.

(21) Appl. No.: 18/420,169

(22) Filed: Jan. 23, 2024

(65) Prior Publication Data

US 2025/0237158 A1　　　Jul. 24, 2025

(51) Int. Cl.
F01D 25/16　　　(2006.01)
F16C 27/04　　　(2006.01)

(52) U.S. Cl.
CPC ............ F01D 25/164 (2013.01); F16C 27/04 (2013.01); F16C 2360/23 (2013.01)

(58) Field of Classification Search
CPC ...... F16C 27/04; F16C 2360/23; F01D 25/16; F01D 25/162; F01D 25/164
See application file for complete search history.

(56) References Cited

U.S. PATENT DOCUMENTS

| | | | |
|---|---|---|---|
| 3,228,090 A | 1/1966 | Schaeffler | |
| 4,403,813 A | 9/1983 | Schaefer | |
| 4,473,260 A | 9/1984 | Nosaka et al. | |
| 4,677,720 A | 7/1987 | Alling et al. | |
| 5,826,988 A | 10/1998 | Furukawa et al. | |
| 7,252,436 B2 | 8/2007 | Yokota et al. | |
| 9,964,150 B2 | 5/2018 | Karlsson et al. | |
| 10,047,793 B2 | 8/2018 | Krebs et al. | |
| 10,197,096 B2 | 2/2019 | Niedermeier | |
| 10,352,194 B2 * | 7/2019 | Varney ................. | F16C 27/045 |

(Continued)

FOREIGN PATENT DOCUMENTS

| | | | |
|---|---|---|---|
| DE | 202021104006 U1 * | 9/2021 | |
| DE | 102020211754 A1 | 3/2022 | |

OTHER PUBLICATIONS

Machine Translation of DE-202021104006-U1 (Year: 2021).*
European Search Report for EP Application No. 25153392.3 dated Jun. 5, 2025.

*Primary Examiner* — Alan B Waits
(74) *Attorney, Agent, or Firm* — Carlson, Gaskey & Olds, P.C.

(57)　　　　ABSTRACT

A ball bearing assembly for an aircraft includes an inner race, a plurality of balls and an outer race positioned radially outwardly of the plurality of balls. The outer race is secured to a squirrel cage that will connect the outer race to static structure. The squirrel cage has a central axis that will be parallel to an axis of rotation of a rotating member to be supported by the balls. The squirrel cage has a plurality of recesses separated by beams. The beams have a radially inner surface and a radially outer surface defined relative to the rotational axis, and extend between axial ends and through an intermediate portion. The beams have a first radial thickness at the axial ends that is greater than a second radial thickness at the intermediate portion. A rotating assembly is also disclosed.

9 Claims, 4 Drawing Sheets

(56) References Cited

U.S. PATENT DOCUMENTS

| 11,193,535 B2 * | 12/2021 | Aury .................... F01D 25/005 |
| 11,519,462 B2 | 12/2022 | Nishikawa et al. |
| 11,674,548 B2 | 6/2023 | Davis et al. |
| 2010/0027930 A1 * | 2/2010 | Kinnaird ................... F02C 7/06 |
| | | 384/523 |
| 2013/0022448 A1 * | 1/2013 | Jadczak ............... F16C 35/073 |
| | | 415/34 |
| 2016/0186607 A1 * | 6/2016 | Witlicki ............... F01D 25/164 |
| | | 415/229 |
| 2017/0145855 A1 * | 5/2017 | Ganiger ............... F16C 35/067 |
| 2017/0248033 A1 | 8/2017 | Moniz et al. |
| 2017/0248191 A1 * | 8/2017 | Husband ................ B22F 5/009 |
| 2018/0094675 A1 * | 4/2018 | Grillo .................... F16C 19/54 |
| 2019/0063261 A1 * | 2/2019 | Varney ............... F16C 33/6659 |
| 2020/0141275 A1 * | 5/2020 | Anglin ................. F16C 27/045 |
| 2023/0061131 A1 | 3/2023 | Bhujabal et al. |

* cited by examiner

AIRCRAFT BALL BEARING SQUIRREL CAGE WITH BEAMS WITH ENLARGED ENDS

BACKGROUND

This application relates to a squirrel cage for use in a ball bearing in aircraft.

Ball bearings are known and are often utilized to support a rotating shaft. An inner race is fixed to rotate with a rotating member, such as a shaft. Ball bearings are positioned between the inner race and a fixed outer race.

A so-called squirrel cage secures the outer race to static structure. The squirrel cage has beams separating openings. Historically, the beams in a squirrel cage have been of a single thickness between two axial ends. Stresses may raise challenges in such a squirrel cage.

SUMMARY

A ball bearing assembly for an aircraft includes an inner race, a plurality of balls and an outer race positioned radially outwardly of the plurality of balls. The outer race is secured to a squirrel cage that will connect the outer race to static structure. The squirrel cage has a central axis that will be parallel to an axis of rotation of a rotating member to be supported by the balls. The squirrel cage has a plurality of recesses separated by beams. The beams have a radially inner surface and a radially outer surface defined relative to the rotational axis, and extend between axial ends and through an intermediate portion. The beams have a first radial thickness at the axial ends that is greater than a second radial thickness at the intermediate portion.

A rotating assembly for an aircraft under this disclosure could be said to include a shaft, a static structure, and a ball bearing assembly supporting the shaft on said static structure. The ball bearing assembly includes an inner race, a plurality of balls and an outer race positioned radially outwardly of the plurality of balls. The outer race is secured to a squirrel cage that will connect the outer race to static structure. The squirrel cage has a central axis that is parallel to an axis of rotation of the shaft. The squirrel cage has a plurality of recesses separated by beams. The beams have a radially inner surface and a radially outer surface defined relative to the rotational axis, and extend between axial ends and through an intermediate portion. The beams have a first radial thickness at the axial ends that is greater than a second radial thickness at the intermediate portion.

These and other features will be best understood from the following drawings and specification, the following is a brief description.

DETAILED DESCRIPTION

Figure 1:
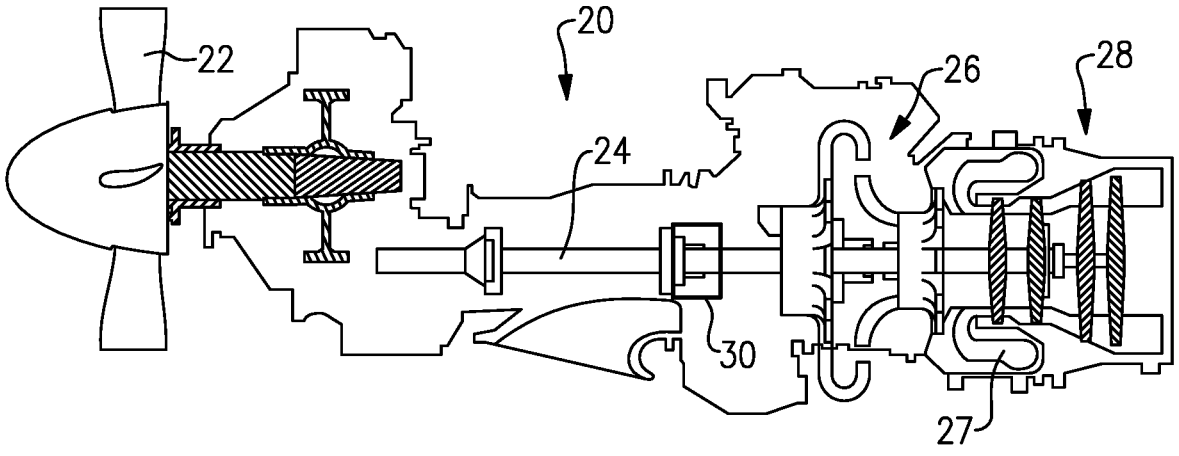
FIG. 1 schematically shows a gas turbine engine.

FIG. 1 shows a gas turbine engine 20 having a propulsor 22 driven by a shaft 24 through a connection (not shown). Shaft 24 may be driven by a turbine section 28. A compressor section 26 receives air to be compressed and delivers it into a combustor 27 where it is mixed with fuel and ignited. Products of this combustion pass downstream over turbine rotors in the turbine section 28 driving them to rotate.

FIG. 1 schematically shows the gas turbine engine 20, and does not show all details of the gas turbine engine.

A ball bearing 30 supports the shaft 24.

Figure 2:
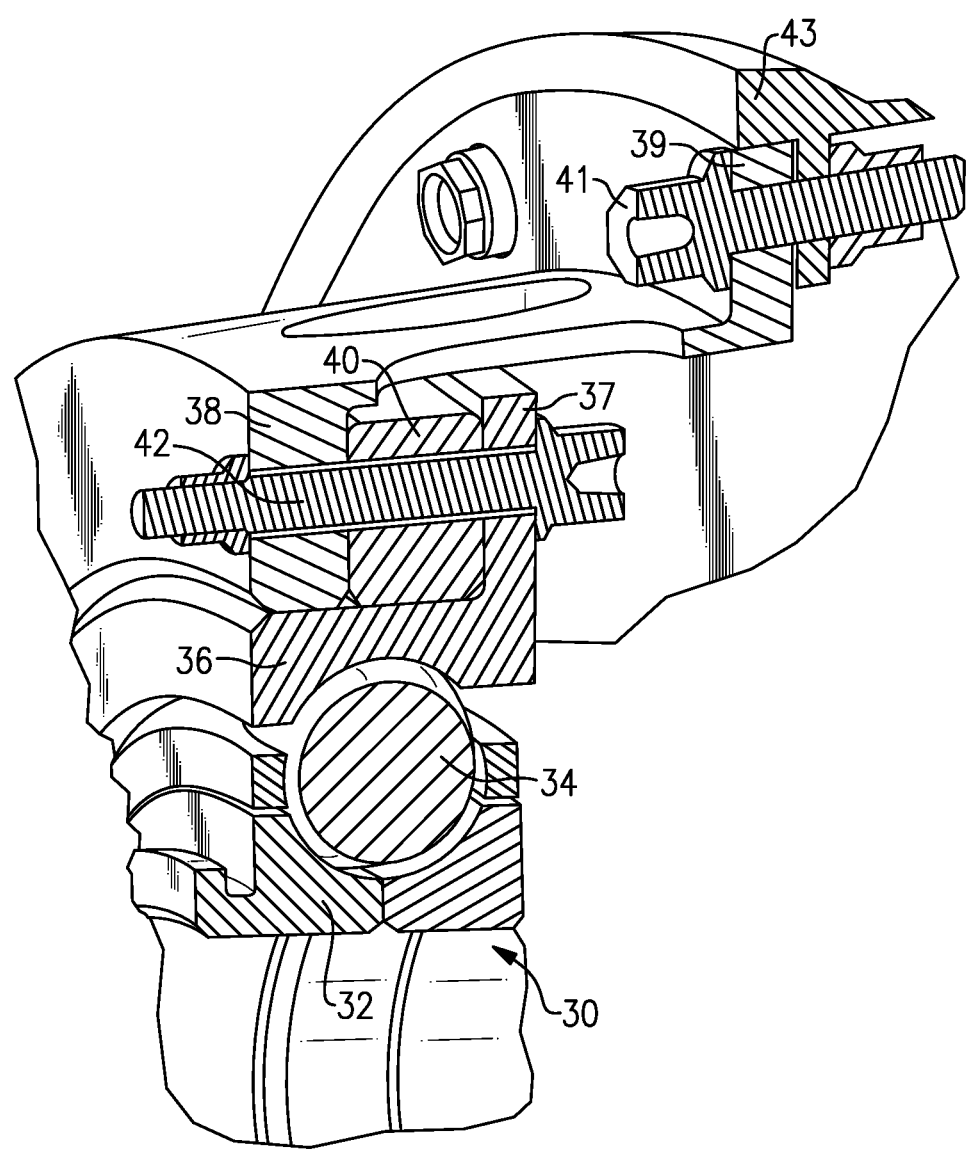
FIG. 2 shows a ball bearing which may be utilized in the FIG. 1 gas turbine engine.

FIG. 2 shows the ball bearing 30 having an inner race 32 that is fixed to rotate with a shaft, such as shaft 24. Spherical balls 34 sit within a groove in the inner race 32. The balls 34 are captured between the inner race 32 and an outer race 36. Outer race 36 has a flange 37 which is pinned to static structure 43 such as by pins 41 and 42 and an intermediate squirrel cage 38.

Squirrel cage 38 connects outer race 36 to the static structure 43 through the pins 42 and 41.

Figure 3:
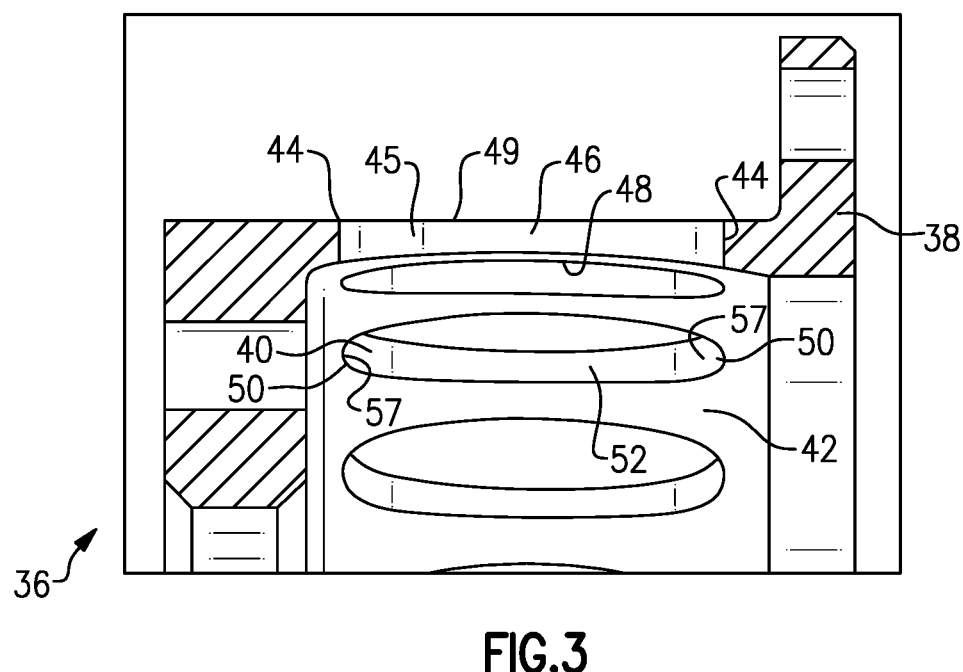
FIG. 3 shows a first embodiment squirrel cage.

As shown in FIG. 3, squirrel cage 38 includes a plurality of openings 40 that reduce weight and maintain flexibility. The openings 40 are separated by beams 42, and extend between axial ends 44. As shown, a radial thickness of the beam 45 at the ends 44 is greater than a radial thickness at a central portion 46. This shape has the potential to achieve lower stresses in the overall squirrel cage than the prior art, which has a generally constant thickness along an axial length of its beams. Here, a radially inner surface 48 of the beam 45 is curved from the ends 44 and through the intermediate portion 46. Conversely, a radially outer surface 49 of the beam 45 extends to be generally parallel to an axis of rotation of the shaft.

The openings 40 are shown in FIG. 3 to have curved surfaces 57 at axial ends 50 and a curved surface 52 along the intermediate portion 46. As shown here, the curved portion 52 on the intermediate portion 46 has a greater radius of curvature than does the curved portions 57 at the axial ends 50. This shape achieves lower stresses in the overall squirrel cage than the prior art, which generally has recesses with straight faces at the intermediate portion 46 and/or at the ends 50.

Figure 4:
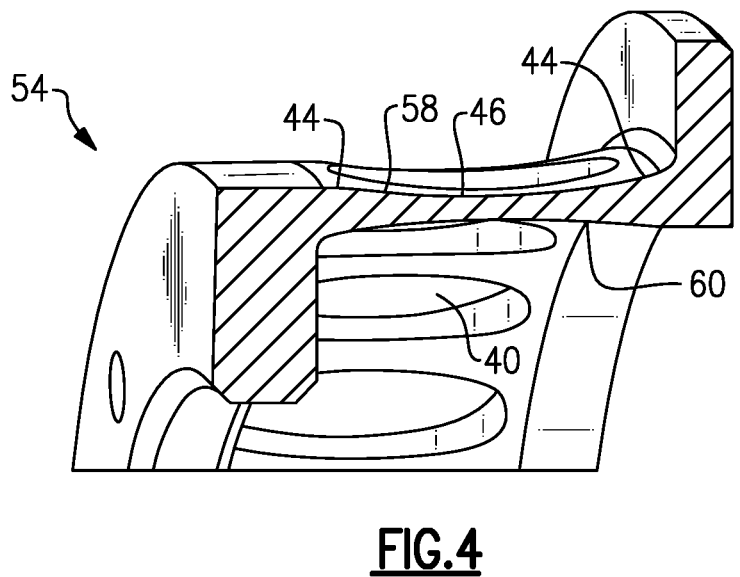
FIG. 4 shows an alternative embodiment squirrel cage.

FIG. 4 shows an alternative squirrel cage embodiment 54 wherein the curves are found both at a radially outer surface 58 and at a radially inner surface 60.

Figure 5:
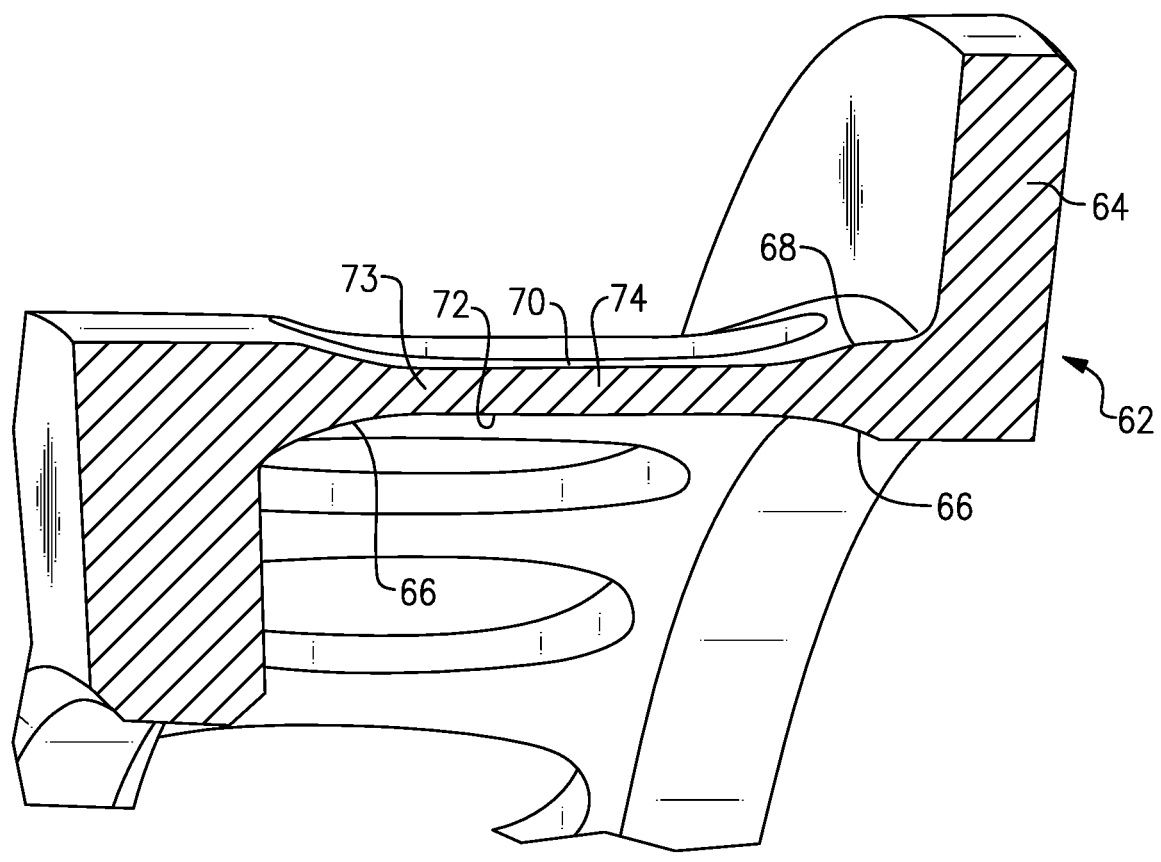
FIG. 5 shows yet another alternative embodiment squirrel cage.

FIG. 5 shows yet another embodiment squirrel cage 62. Here the flange 64 extends into beams 70 having curved thicker portions at axial ends 66 and an intermediate portion 73 which is generally parallel to the rotational axis at both radially inner surface 72 and radially outer surface 74.

A ball bearing assembly for an aircraft under this disclosure could be said to include an inner race, a plurality of balls and an outer race positioned radially outwardly of the plurality of balls. The outer race is secured to a squirrel cage that will connect the outer race to static structure. The squirrel cage has a central axis that will be parallel to an axis of rotation of a rotating member to be supported by the balls. The squirrel cage has a plurality of recesses separated by beams. The beams have a radially inner surface and a radially outer surface defined relative to the rotational axis, and extend between axial ends and through an intermediate portion. The beams have a first radial thickness at the axial ends that is greater than a second radial thickness at the intermediate portion.

In another embodiment according to the previous embodiment, wherein the recesses are formed along a curve, such that there are end curved recess portions at the axial ends, and intermediate curved recess portion through the intermediate portion.

In another embodiment according to any of the previous embodiments, the intermediate curved recess portion has a greater radius of curvature than does the end curved recess portions at the axial ends.

In another embodiment according to any of the previous embodiments, the radially inner surface of the beam has curves at each of its axial ends merging into the beam intermediate portion.

In another embodiment according to any of the previous embodiments, the radially inner surface is also curved through the intermediate portion.

In another embodiment according to any of the previous embodiments, the radially outer surface of the beam also extends along curves between the axial ends and through the intermediate portion.

In another embodiment according to any of the previous embodiments, the beam has curves at the radially inner surface of the beam at the axial ends, but a generally flat surface that is generally parallel to the rotational axis through the intermediate portion.

In another embodiment according to any of the previous embodiments, the beam has curves at the radially outer surface of the beam at the axial ends, but a generally flat surface that is generally parallel to the rotational axis through the intermediate portion.

A rotating assembly for an aircraft under this disclosure could be said to include a shaft, a static structure, and a ball bearing assembly supporting the shaft on said static structure. The ball bearing assembly includes an inner race, a plurality of balls and an outer race positioned radially outwardly of the plurality of balls. The outer race is secured to a squirrel cage that will connect the outer race to static structure. The squirrel cage has a central axis that is parallel to an axis of rotation of the shaft. The squirrel cage has a plurality of recesses separated by beams. The beams have a radially inner surface and a radially outer surface defined relative to the rotational axis, and extend between axial ends and through an intermediate portion. The beams have a first radial thickness at the axial ends that is greater than a second radial thickness at the intermediate portion.

In another embodiment according to any of the previous embodiments, wherein the recesses are formed along a curve, such that there are end curved recess portions at the axial ends, and intermediate curved recess portion through the intermediate portion.

In another embodiment according to any of the previous embodiments, the intermediate curved recess portion has a greater radius of curvature than does the end curved recess portions at the axial ends.

In another embodiment according to any of the previous embodiments, the radially inner surface of the beam has curves at each of its axial ends merging into the beam intermediate portion.

In another embodiment according to any of the previous embodiments, the radially inner surface is also curved through the intermediate portion.

In another embodiment according to any of the previous embodiments, the radially outer surface of the beam also extends along curves between the axial ends and through the intermediate portion.

In another embodiment according to any of the previous embodiments, the beam has curves at the radially inner surface of the beam at the axial ends, but a generally flat surface that is generally parallel to the rotational axis through the intermediate portion.

In another embodiment according to any of the previous embodiments, the beam has curves at the radially outer surface of the beam at the axial ends, but a generally flat surface that is generally parallel to the rotational axis through the intermediate portion.

In another embodiment according to any of the previous embodiments, the radially inner surface of the beam has curves at each of its axial ends merging into the beam intermediate portion.

In another embodiment according to any of the previous embodiments, the radially outer surface of the beam also extends along curves between the axial ends and through the intermediate portion.

In another embodiment according to any of the previous embodiments, the shaft is part of a gas turbine engine.

In another embodiment according to any of the previous embodiments, the shaft drives a propulsor in the gas turbine engine.

Although embodiments have been disclosed, a worker of skill in this art would recognize that modifications would come within the scope of this disclosure. For that reason, the following claims should be studied to determine the true scope and content.

What is claimed is:

1. A ball bearing assembly for an aircraft, comprising:
an inner race, a plurality of balls and an outer race positioned radially outwardly of the plurality of balls, the outer race is secured to a squirrel cage to connect the outer race to static structure;
the squirrel cage having a central axis that will be parallel to an axis of rotation of a rotating member to be supported by the balls; and
said squirrel cage having a plurality of recesses separated by beams, the beams having a radially inner surface and a radially outer surface defined relative to the rotational axis, and extending between axial ends and through an intermediate portion, and the beams having a first radial thickness at the axial ends that is greater than a second radial thickness at the intermediate portion;
wherein the recesses are formed along a curve, such that there are end curved recess portions at the axial ends, and intermediate curved recess portion through the intermediate portion;
wherein the radially inner surface of the beam has curves at each of the axial ends merging into the beam intermediate portion; and
wherein the beam has curves at the radially inner surface of the beam at the axial ends, but a flat surface that is parallel to the rotational axis through the intermediate portion.

2. A rotating assembly for an aircraft, comprising:
a shaft;
a static structure, and a ball bearing assembly supporting said shaft on said static structure;
the ball bearing assembly having an inner race, a plurality of balls and an outer race positioned radially outwardly of the plurality of balls, the outer race secured to a squirrel cage that connects the outer race to static structure;
the squirrel cage having a central axis that is parallel to an axis of rotation of the shaft;
said squirrel cage having a plurality of recesses separated by beams, the beams having a radially inner surface and a radially outer surface defined relative to the central axis, and extending between axial ends and through an intermediate portion, and the beams having a end radial thicknesses at each of the axial ends that is greater than an intermediate radial thickness at the intermediate portion;

wherein the recesses are formed along a curve, such that there are end curved recess portions at the axial ends, and intermediate curved recess portion through the intermediate portion;

wherein the radially inner surface of the beam has curves at each of the axial ends merging into the beam intermediate portion; and wherein the beam has curves at the radially inner surface of the beam at the axial ends, but a flat surface that is parallel to the rotational axis through the intermediate portion.

3. The rotating assembly as set forth in claim 2, wherein the intermediate curved recess portion has a greater radius of curvature than does the end curved recess portions at the axial ends.

4. The rotating assembly as set forth in claim 2, wherein the radially inner surface is also curved through the intermediate portion.

5. The rotating assembly as set forth in claim 2, wherein the radially outer surface of the beam also extends along curves between the axial ends and through the intermediate portion.

6. The rotating assembly as set forth in claim 2, wherein the radially inner surface of the beam has curves at each of its axial ends merging into the beam intermediate portion.

7. The rotating assembly as set forth in claim 6, wherein the radially outer surface of the beam also extends along curves between the axial ends and through the intermediate portion.

8. The rotating assembly as set forth in claim 2, wherein the shaft is part of a gas turbine engine.

9. The rotating assembly as set forth in claim 8, wherein the shaft drives a propulsor in the gas turbine engine.

* * * * *